Oct. 4, 1966  V. L. CARNEY  3,277,339
ELECTROLUMINESCENT SCANNING AND DISPLAY SYSTEM
Filed April 5, 1963  2 Sheets-Sheet 1
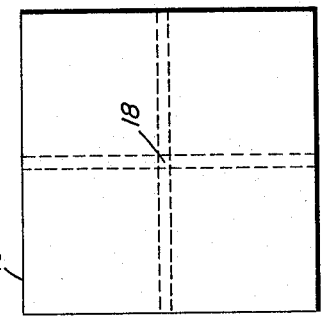
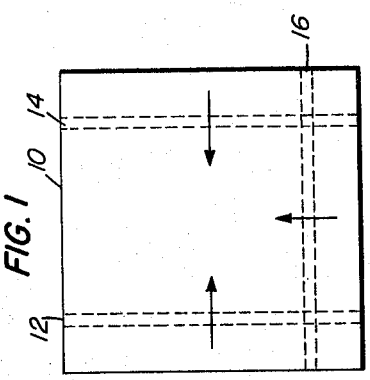
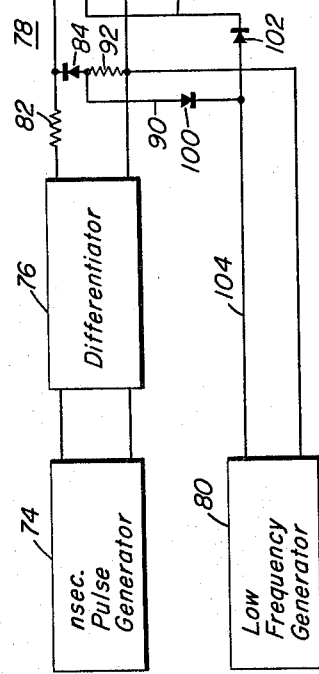
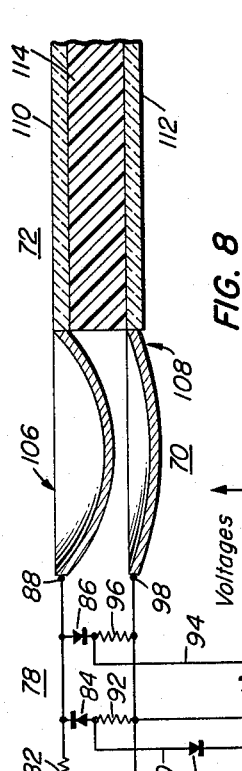
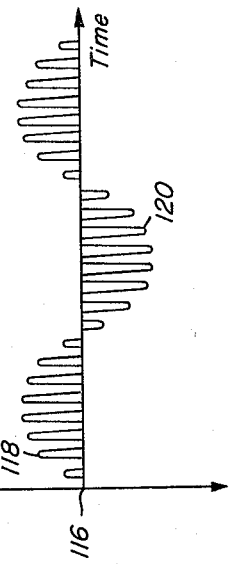
INVENTOR
Vincent L. Carney

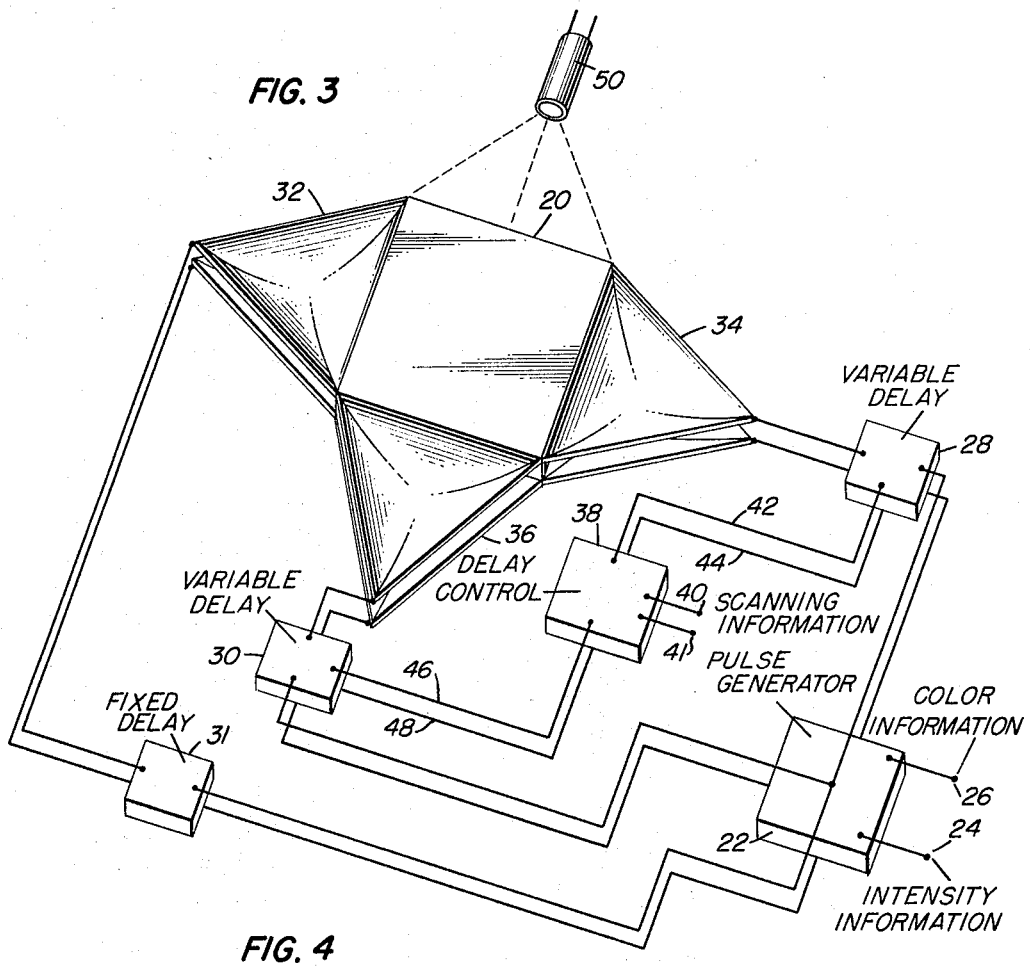
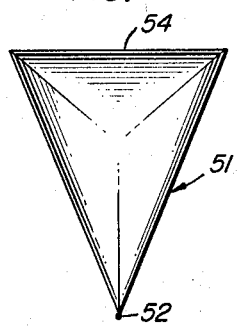
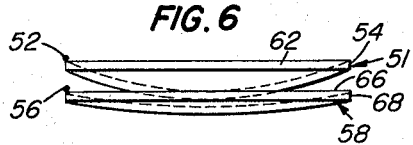

United States Patent Office 3,277,339
Patented Oct. 4, 1966

3,277,339
ELECTROLUMINESCENT SCANNING AND DISPLAY SYSTEM
Vincent L. Carney, 8508 16th St., Silver Spring, Md.
Filed Apr. 5, 1963, Ser. No. 272,820
4 Claims. (Cl. 315—160)

This invention relates to display devices and more particularly relates to a method and apparatus for electrically controlling images on a display device.

It is desirable to have a display device which is electrically controlled and yet does not require a high vacuum such as the cathode ray tube requires. However, most present solid state display devices which are electrically controlled ase in the form of matrices and thus require a large number of electrical connections Accordingly, it is an object of this invention to provide an improved display device.

It is a further object of this invention to provide a solid state display device.

It is a further object of this invention to provide a method and apparatus for operating a display device electrically.

It is still another object of this invention to provide a method and apparatus for modulating a spot of light as to position and intensity by means of standing waves.

The invention and the above noted and other features thereof will be understood more clearly and fully from the following detailed description with reference to the accompanying drawings in which:

FIGURE 1 is a flow diagram illustrating one stage in the operation of an embodiment of the invention;

FIGURE 2 is a flow diagram illustrating another stage in the operation of an embodiment of the invention;

FIGURE 3 is a perspective view of an embodiment of the invention;

FIGURE 4 is a top view of a wave-front straightener which may be used in an embodiment of the invention;

FIGURE 5 is a front view of a wave-front straightener which may be used in an embodiment of the invention;

FIGURE 6 is a side view of a wave-front straightener which may be used in an embodiment of the invention;

FIGURE 7 is a partial schematic block diagram of an embodiment of the invention showing a wave-front straightener and part of a display device in a sectional view; and FIGURE 8 is a graph in which the ordinates are voltages that appear in an embodiment of the invention and the abscissae are time.

Referring now in particular to FIGURE 1, a flow diagram is shown in which 10 is a display surface, 12 is a wave front of energy traveling from left to right, 14 is a wave front of energy traveling from right to left and 16 is a wave front of energy traveling from bottom to top. The display surface 10 may include two parallel plate conductors with a luminescent material sandwiched in between. The wave fronts 12, 14 and 16 are voltages with a very short duration and having the same polarity, which may be either positive or negative.

The wave fronts 12, 14 and 16 intersect at a point 18 on the display surface 10 as shown in FIGURE 2, where they add to form a point of higher energy than that of the individual wave fronts. This process is repeated so that the average energy at the point 18 is significant. The spot 18 may be moved in any direction by changing the timing of the wave fronts 12, 14 and 16. The wave fronts may be individually generated at each side and the display surface may be terminated so as to be reflectionless or reflected waves may be used to create the standing waves.

It will be observed that in the explanation accompanying FIG. 1 and FIG. 2 the wavelength (time between corresponding points on two successive pulses of a train of pulses) is large enough so that the wave fronts intersect at only one point. This is the most common mode for a flying spot type of scanner.

Reflectionless terminations and terminations which cause standing waves by creating reflections are discussed in Chapter I of "Transmission Lines and Networks" by Walter C. Johnson, McGraw-Hill Book Company, Inc., 1950. The equation for the characteristic impedance of the device used by applicant is given on page 90 of this book and also on pages 20–42 of "Electronic Designers' Handbook" by Landee, Davis, and Albrecht, McGraw-Hill Book Company, Inc., 1957. However, even though these books state methods of calculating proper terminations, it is apparent that the terminations for a particular display can be conveniently obtained by trial and error in the manner practiced in the art. Some general equipment and techniques for proper impedance matching are disclosed on pages 209–218 of "Microwave transmission Circuits" by George L. Ragan, Radiation Laboratory Series, volume 9, 1948, McGraw-Hill Book Company, Inc.

A perspective view of an embodiment of the invention is shown in FIGURE 3 having a display surface 20 adapted to be scanned by a luminous spot which may be controlled in position on the display surface, in intensity of light, and in color so as to be capable of presenting changeable, color images such as are used in television.

Intensity and color information are applied in the form of electrical signals to the pulse generator 22 through the terminals 24 and 26 respectively, which are electrically coupled to the pulse generator 22. The pulse generator 22 may be a vacuum tube of the type described by E. W. Ernest and H. Von Foerster in the article "Electron Bunches of Short Time Duration," Journal of Applied Physics, 1954, 25 674–5. The pulse generator of that article is capable of producing pulses having a duration of approximately $2 \times 10^{-12}$ seconds. Also, the combination of a differentiator preceded by either a spark gap pulse generator, such as that described by J. B. Gunn in the article "Bouncing Ball Pulse Generator" in the I.B.M. Technical Disclosure Bulletin, vol. 5, No. 8, January, 1963, a beam deflection klystron, or a magnetron pulse generator may be used.

The pulse generator 22 is electrically connected to the variable delay 28, the variable delay 30 and the fixed delay 31 which are in parallel with each other electrically. The variable delay 28, the variable delay 30 and the fixed delay 31 are also electrically connected to the wave-front straightener 34, the wave-front straightener 36 and the wave-front straightener 32, respectively. Scanning information is applied to the delay control 38 through the terminals 40 and 41 to which it is connected. The delay control 38 is electrically connected to the variable delay 28 by conductors 42 and 44, and to the variable delay 30 by conductors 46 and 48.

If the display surface 20 is used for television reception, the delay control 38 contains the usual line scanning and field scanning generators. Synchronizing signals applied to the delay control 38 initiate sawtooth waveforms which are conducted to the variable delay 28 to cause line scanning on the display surface 20 in a manner to be discussed later. Also, field scanning sawtooth waveforms of a lower frequency are generated by the field scanning generator and are applied to the variable delay 30 to cause the vertical deflection on the display surface 20. A simpler motion of a luminous spot on the display surface 20 can be obtained if terminal 40 is connected to conductor 42 and terminal 41 is connected to conductor 46. A D.C. (direct current) voltage applied to terminal 40 causes the luminous spot to move on the display surface 20 toward the wavefront straightener 34 and a D.C. voltage applied to terminal 41 causes the luminous spot to move on the display surface 20 toward wavefront straightener 36.

The variable delays 28 and 30 may include a variable capacitance diode connected between the transmission lines leading from the pulse generator 22. The sawtooth waveforms are applied across the diodes to increase the capacitance of the transmission lines and to thereby delay the pulses from the pulse generator 22.

The variable delays may include series inductors having a core which is biased by the sawtooth waveforms from the delay control 38 so as to increase the series inductance of the transmission lines and thereby delay the voltage pulses from the pulse generator 22.

The wavefront straighteners 32, 36 and 34 are each connected to one edge of the square, flat display surface 20. They each include two parallel conductors, curved downward in the center with the top conductor having a greater curvature than the bottom conductor. The two conductors are insulated from each other. The widest portion is connected to the display surfaces 20 and the conductors taper to a point at the other end. This point contains a terminal for electrical connection to the transmission line which carries pulses from the pulse generator 22.

The display surface 20 includes two flat, parallel conductors separated by a dielectric material and a phosphor which may be mixed with the dielectric or which may form a separate layer instead. One of the flat, parallel conductors must be transparent or translucent. Either a stainless steel mesh or a vaporized metal on a transparent, insulative base such as glass may be used. The stainless steel mesh of 260 mesh is pressed into the phosphor layer or into a layer of epoxy resin which may be used to coat the layer of phosphor material. A thin layer of metal such as tin or aluminum may be evaporated onto glass so as to form a suitable transparent conductor. A method of applying a thin conductive coating without the use of vaporized gasses is described in U.S. Patent No. 3,043,978. Of course, the conductors must be properly terminated to prevent reflections.

The layer of phosphor may include a mixture of electroluminescent phosphors each of which emits a different color when submitted to A.C. (alternating current) voltages or to currents through it or it may instead include a layer of photoluminescent phosphors which emit light when exposed to a D.C. voltage and ultraviolet radiation from the source 50. The color of the light is determined by superimposed RF (radio frequency) voltages. If electroluminescent material is used the source of ultraviolet radiation 50 is not needed and the polarity of the voltage pulses from pulse generator 22 is periodically changed from 60 to 1,000 times each second depending upon the color desired and the particular electroluminescent material used. If photoluminescent material is used the source of ultraviolet radiation 50 must be used, the polarity of the voltage pulses from the source 22 does not change and the color of the light emitted from the display surface is modulated by superimposing RF voltage upon the flat, parallel conductors of a frequency corresponding to the desired color.

The pulse generator 22 develops voltage pulses of very short duration which are conducted to the variable delay 28, the variable delay 30 and the wavefront straightener 32. These pulses pass through the variable delay 28 to the wavefront straightener 34 and through the variable delay 30 to the wavefront straightener 36. The pulse generators referred to in the explanation of FIG. 3 and FIG. 7 are capable of generating pulses having a wide range of pulse durations, any of which may be selected depending upon the size of the spot of light desired. Of course, as explained in connection with FIG. 1 and FIG. 2, the larger the pulse duration the larger the luminous spot. Similarly, a wide range of frequencies and voltages may be used as pointed out in the explanation of FIG 7.

If these short pulses were connected directly to a flat display surface, they would form arcuate wavefronts having the point of connection as a center from which each point on a wavefront travels radially at the same speed. However, the wavefront straighteners straighten out this arc by either slowing down the points on the arc that have the shortest distance to go before reaching the display surface or by causing these points to travel by a longer indirect route so that they travel the same distance as all other points. The wavefront straighteners form the short pulses into three thin, straight lines of electrical voltage which are conducted to three sides of the square display surface 20. These three waves of energy are propagated across the display surface 20 and intersect at one point. Repeated pulses are made to intersect at the same point so as to cause a greater energy peak to appear at that point. Luminous phosphors are utilized between two conductors that make up the display surface 20. These phosphors emit light in response to the electrical voltages in a nonlinear manner: emitting more light at the point of higher peak voltage than at points of the same average voltage with lower peak voltage levels. Consequently, the amplitude of the pulses from the pulse generator 22 may be adjusted so that light is emitted at the standing wave created by the intersection of the three voltage waves and at no other point. This point of intersection can be moved by changing the amount of delay in the variable delay 30 or the variable delay 28. The pulse generator 20 provides pulses which change polarity if electroluminescent materials are used or which maintain one polarity if photoluminescent materials are used as described in the copending application of Vincent L. Carney, Serial No. 270,889 filed April 5, 1963, now Patent No. 3,081,123, and entitled Color Conversion System.

A top view of a wavefront straightener is shown in FIGURE 4 having a top terminal 52 and a top wide edge 54 on a top conductor 51. The wavefront straightener includes two sheets of conductive material such as copper. The terminal 52 is electrically connected to the pulse generator 22 so as to receive submillimeter voltage pulses from it, and the wide edge 54 is electrically connected to the display surface 20 so as to pass the thin line of energy on to the display surface.

A front view of the wavefront straightener is shown in FIGURE 5, having a top terminal 52 on the top conductor 51 and a bottom terminal 56 on the bottom conductor 58. The left top edge 60, the right top edge 62, the left bottom edge 64 and the right bottom edge 66 each slant back and outward from the terminals so as to form the shortest line to the back edges which are connected to the display surface 20. The surfaces of the conductors 51 and 58 are concave so as to provide an output wave which is parallel to the side of the display surface and which is straight.

A side view of the wavefront straightener is shown in FIGURE 6, having an upper terminal 52, a lower terminal 56, an upper right side edge 62, and a lower right side edge 66, an upper wide edge 54 and a lower wide edge 68. The surfaces of the upper conductor 51 and the lower conductor 58 are concave so that the distance along the surface from the terminal 52 to each point on the straight line 54 and from the terminal 56 to each point on the straight line 68 are equal. A string held with one end at terminal 52 and the other end at a point on the edge 54 with its length touching along the surface of the conductor 51 in the shortest path between the terminal 52 and the point on edge 54, could be moved to any other point on the edge 54 without using a different amount of its length. The same can be done for the conductor 58.

However, if it is desirable to have less depth to the conductors 51 and 58, the top conductor 51 may be deeper than the bottom conductor 58 so that they are closer together at their central portions than at their edges. This increases the capacity of the two conductors near their center and reduces the velocity of propagation so as to delay the voltage pulses more at their center than at their edges. Also, instead of straightening the wave fronts, curved energy waves may be used and compensated for by the timing of the delays. The amount of correction that is required from the wavefront straightener can be expressed in the form of an equation representing distances along an axis of a display surface by R and distances perpendicular to an axis by X.

If the display device is considered as having two perpendicular axes intersecting each other at the center of the display surface and intersecting the edges of the display device at terminal points, voltage pulses applied to three terminal points intersect in one point of high voltage to create a luminous spot. However, the wavefronts leaving the terminal points assume the shape of an arc since every point on the wavefront travels radially away from the terminal point with equal velocity. The points on the wavefront travelling along the axes reach the center of the display surface first and then the other points follow.

When a flat display surface is used, the timing of a moving spot is simplified if the wavefronts form straight lines perpendicular to their axis rather than curves. However, a point on a wavefront reaches a point along the axis a distance R from the terminal point before another point on the same wavefront reaches a point a distance X from R on a line perpendicular to the axis unless a correction is made. This is because the wavefront must travel a distance $(R^2+X^2)^{1/2}$ to reach X according to the sum of the squares rule for right triangles. The increase in distance to reach X over the distance to reach R is $(R^2+X^2)^{1/2}-R$. The time it takes to reach these points can be made equal by increasing the length the wavefront travels along the axis by bending the axis or by slowing down the rate of travel along the axis by increasing its reactance or by a combination of the two.

A partial schematic block diagram of an embodiment of the invention is shown in FIGURE 7 having a wavefront straightener 70 and a display surface 72 shown in section. A nanosecond ($10^{-9}$ seconds) pulse generator 74, which may be of the spark gap generator type or of the regenerative pulse generator type described by C. C. Cutler in "The Regenerative Pulse Generator"; Proc. Inst. Radio Engrs., 1955 43 140-8, is electrically connected to the differentiator 76 which may be a shorted section of transmission line. The output of differentiator 76 is electrically coupled to the input of the gate 78.

A low frequency A.C. generator 80 has its output electrically connected to the gate control of the gate 78. It provides an A.C. output that is adjustable between 60 and 1,000 c.p.s. (cycles per second) to the gate 78. If color changes are not desired a constant 60 c.p.s generator may be used instead of the variable frequency generator.

The gate 78 includes the resistor 82 which is electrically connected at one end to the first output terminal of the differentiator 76 and at the other end to the cathode of diode 84, to the anode of diode 86 and to the top terminal 88 of the wavefront straightener 70. The anode of diode 84 is electrically connected to the anode of diode 100 through conductor 90 and to the first end of resistor 92; the cathode of diode 86 is electrically connected to the cathode of diode 102 and to the first end of resistor 96. The cathode of diode 100 and the anode of diode 102 are each connected to a first output terminal of the low frequency A.C. generator 80 through conductor 104. The second ends of resistors 92 and 96 are electrically connected to each other, to the second ouput terminal of the differentiator 76, to the bottom terminal 96 of the wavefront straightener 70 and to the second output terminal of the low frequency A.C. generator 80.

The nsec. (nanosecond) pulse generator 74 provides rectangular voltage pulses of short time duration to the differentiator 76. The differentiator 76 differentiates both the rising and falling edges of the voltage pulses from the nsec. pulse generator 74 so as to provide a plurality of positive and negative submillimeter pulses to the gate 78.

When the polarity of the low frequency A.C. generator 80 is such that conductor 104 is positive, the gate 78 only passes positive submillimeter pulses from the differentiator 76 to the wavefront straightener 70. This is because both diode 84 and diode 86 offer a high resistance to positive pulses but diode 84 offers a low resistance to negative pulses and shunts them. Diode 86, which would normally offer low resistance to positive pulses is blocked by the positive voltage from the low frequency A.C. generator 80 which is conducted through conductor 104, and diode 102 to the cathode of the diode 86.

When the polarity of the low frequency A.C. generator 80 is such that conductor 104 is negative, the gate 78 only passes negative submillimeter pulses from the differentiator 76 to the wavefront straightener 70. This is because both diode 84 and diode 86 offer a high resistance to negative pulses but diode 86 offers a low resistance to positive pulses and shunts them. Diode 84, which would normally offer low resistance to negative pulses is blocked by the negative voltage from the low frequency A.C. generator 80 which is conducted through conductor 104, and diode 100 to the anode of the diode 84.

The wavefront straightener receives the submillimeter voltage pulses across the upper terminal 88 and the lower terminal 98 and conducts the voltages as thin lines of voltage across the upper conductor 106 and the lower conductor 108 to the flat, transparent upper conductor 110 and the parallel flat bottom conductor 112 of the display surface 72. A layer of electroluminescent material and dielectric material 114 is sandwiched inbetween the two conductors 110 and 112. The layer of electroluminescent material 114 may include a mixture of electroluminescent phosphors each of which emits a different color when submitted to A.C. voltages. Methods of making such phosphors are described in U.S. Patents Nos. 2,964,666 and 3,031,415.

Materials that emit colors of red, blue and yellow when voltages of 60 c.p.s. to 1000 c.p.s. and voltages between 100 and 1000 volts are applied may be used in a mixture of powders bound together by epoxy resin. Also thin layers of different phosphors may be applied one on top of the other. However, other colors and shades may be used according to the requirements of the display. An example of the manner in which the phosphor powders may be bonded by a dielectric material is given in U.S. Patent No. 3,018,402. Of course, light of a single color may be used either by itself or in conjunction with a color converter of the type described in the copending application of Vincent L. Carney, Serial No. 270,889 filed April 5, 1963, entitled Color Conversion System.

As explained above, photoluminescent material may be used instead of the electroluminescent material in the layer 114. This layer may be constructed in the manner described in U.S. Patents No. 2,909,692. RF energy controls the color of light emitted from this layer through the photoluminescent process in the manner described in U.S. Patent Nos. 3,043,987 and 2,780,731. The gate 78 is replaced by a series rectifier so that the submillimeter voltage pulses always have the same polarity. Also, a source of ultraviolet light irradiates the photoluminescent material.

A graph which illustrates the action of the gate 78 which may be used with an electroluminescent display surface is shown in FIGURE 8, in which the ordinates are voltages passed by the gate 78 to the wavefront straightener 70 and the abscissae are time. When the voltage provided to conductor 104 by the low frequency A.C. generator 80 is at ground level the negative submillimeter pulses from the differentiator 76 are shunted by the diode 84 and the positive submillimeter pulses from the differentiator 76 are shunted by the diode 86 so that no voltage pulses are passed to the wavefront straightener 70 as is indicated by the origin 116 of the graph in FIGURE 8.

As the low frequency A.C. generator 80 provides an increasingly positive voltage to the conductor 104, the negative submillimeter pulses continue to be shunted to ground by diode 84 since the diode 100 blocks the positive voltage on conductor 104 from the anode of diode 84, but the positive submillimeter pulses 118 are passed with an increasing amplitude since the positive voltage from line 104 passes through diode 102 and blocks diode 86 at its cathode. Similarly when the low frequency A.C. generator 80 provides a negative voltage to conductor 104, the gate 78 passes only negative submillimeter pulses. This is because the negative voltage from the low frequency A.C. generator 80 is blocked from the cathode of diode 86 by the diode 102 so that diode 86 shunts the differentiator 76 as to these positive pulses, but the negative voltage from the low frequency A.C. generator 80 is passed to the anode of diode 84 through diode 100 and blocks this diode.

Both the electroluminescent display and the photoluminescent display provide a flat, solid-state display device in which the form and color of the image may be controlled electrically. It avoids many of the problems now associated with high vacuum devices and devices which require matrix type connections to operate.

Obviously, many modifications and variations of the present invention are possible in the light of the above teachings. It is therefore to be understood that within the scope of the appended claims the invention may be practiced otherwise than as specifically described.

What is claimed is:

1. A combination comprising:
phosphor means for emitting light when a potential difference is applied across it;
a first conductor on one side of said phosphor means;
said first conductor being capable of passing light;
a second conductor on a second side of said phosphor means;
said first and second conductors being positioned such that at least part of a potential difference between said first and said second conductors is applied across said phosphor means;
said phosphor means, first conductor, and second conductor being positioned with respect to one another so as to form a display surface bounded by a plurality of edges and having a front surface on which a spot of light emitted by said phosphor means may be displayed through said first conductor;
said edges being terminated in the characteristic impedance of the transmission line formed by said first and second conductors and said phosphor means;
a first, second, and third terminal adapted to receive voltage pulses;
first conductor means for conducting electrical energy from said voltage pulses to a substantial area of a first of said edges of said display surface through a first plurality of different paths from said first terminal to said first edge;
each of said first plurality of paths having substantially the same time delay from said first terminal to said first edge for said electrical energy;
second conductor means for conducting electrical energy from said voltage pulses to a substantial area of a second of said edges of said display surface through a second plurality of different paths from said second terminal to said second edge;
each of said second plurality of paths having substantially the same time delay from said second terminal to said second edge for said electrical energy;
third conductor means for conducting electrical energy from said voltage pulses to a substantial area of a third of said edges of said display surface through a third plurality of different paths from said third terminal to said third edge;
said second edge being substantially parallel to said first edge and said third edge being substantially perpendicular to said first edge;
generator means for generating A.C. voltage pulses having a wavelength at least as long as one half of the shortest distance between any two parallel edges of said display surface;
first and second variable delay lines electrically connected to said first and second terminals respectively; and
gate means for alternately passing a group of positive pulses from said A.C. pulses and a group of negative pulses from said A.C. pulses;
said gate means connecting said alternate groups of positive and negative pulses to said first variable delay line, to said second variable delay line, and to said third terminal, whereby said pulses result in a spot of light on said display surface caused by standing waves from said electrical energy transmitted to said first and second conductors by said first, second, third conductor means at a location determined by the amount of delay in said first and second variable delay lines.

2. A combination according to claim 1 in which said phosphor means comprises a layer of electroluminescent material.

3. A combination according to claim 1 in which said phosphor means comprises a layer of photoluminescent material and said combination includes a means for irradiating said photoluminescent material with ultraviolet light.

4. A combination according to claim 2 in which said display surface is reactilinear in shape.

References Cited by the Examiner

UNITED STATES PATENTS

| 2,780,731 | 2/1957 | Miller | 313—108.1 |
| 2,917,669 | 12/1959 | Yando | 315—169 |
| 2,955,231 | 10/1960 | Aiken | 315—169 |
| 2,979,676 | 4/1961 | Rueger | 333—84 |
| 3,118,079 | 1/1964 | Lehmann | 313—108.1 |
| 3,121,824 | 2/1964 | Talesnick | 315—169 |
| 3,249,804 | 5/1966 | Aiken | 315—169 |

DAVID J. GALVIN, *Primary Examiner.*

JOHN W. HUCKERT, D. E. PITCHENIK,
*Assistant Examiners.*